CLIFFORD B. DAVIDS,
ROLAND H. THORSELL
INVENTOR.

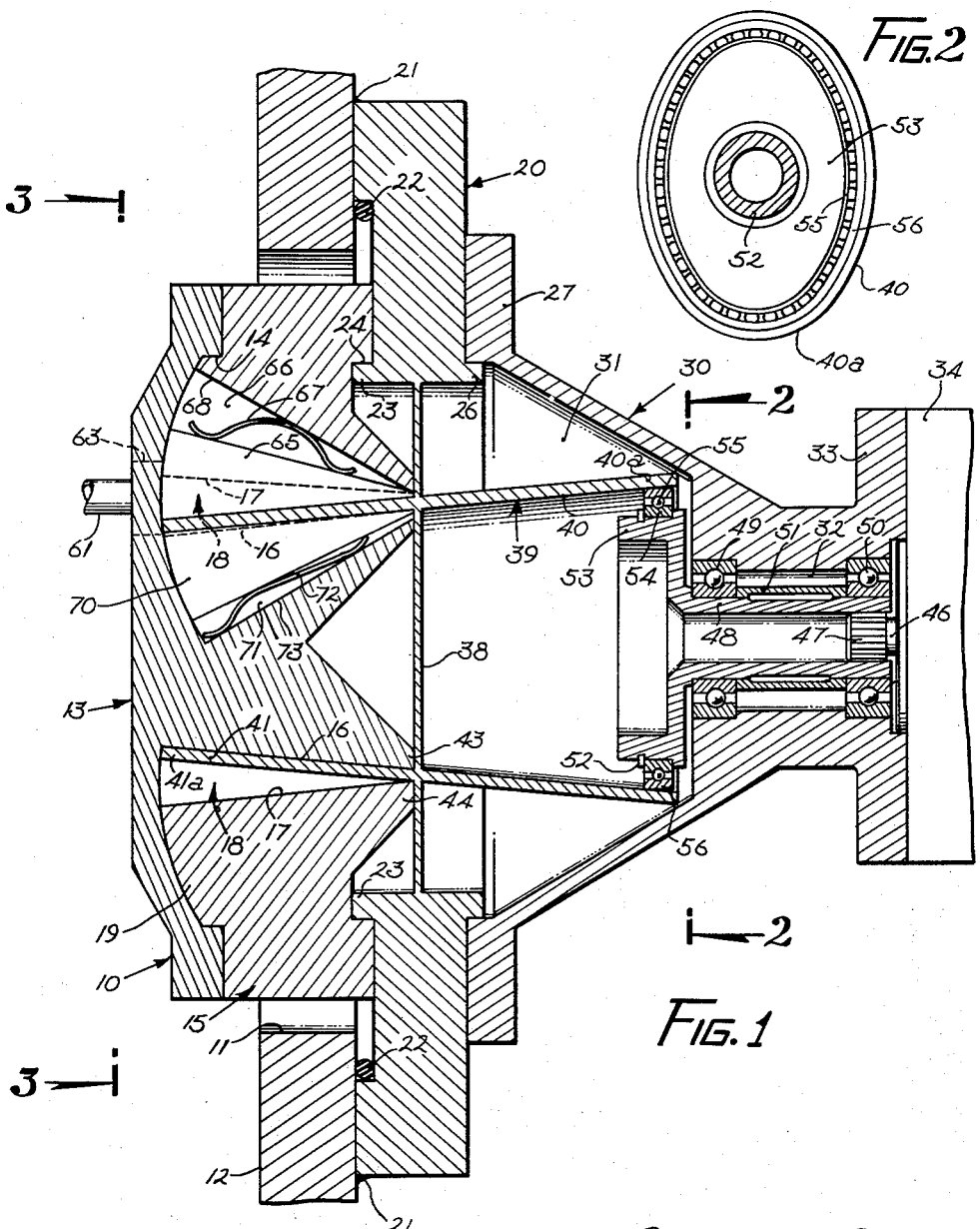

BY R. E. Granger

ATTORNEY

June 22, 1965  C. B. DAVIDS ETAL  3,190,227
FLUID DEVICE

Filed Sept. 4, 1964  3 Sheets—Sheet 3

CLIFFORD B. DAVIDS,
ROLAND H. THORSELL
INVENTOR.

BY R. E. Geangue
ATTORNEY

United States Patent Office 3,190,227
Patented June 22, 1965

3,190,227
FLUID DEVICE
Clifford B. Davids, Woodland Hills, and Roland H. Thorsell, Granada Hills, Calif., assignors to The Marquardt Corporation, Van Nuys, Calif., a corporation of California
Filed Sept. 4, 1964, Ser. No. 394,467
9 Claims. (Cl. 103—117)

This invention relates to a fluid device usable either as a pump or as a fluid motor and more particularly to such a device connected with an input or output member which requires no dynamic fluid seal.

Certain fluids, such as cryogen fluid used in cryogenic systems, are difficult to handle because of the properties of the fluids. Current devices for handling hazardous fluids have used either (a) spaced seals with a vent chamber therebetween (b) bellows or (c) the harmonic drive principle. However, these devices have problems such as external leakage and loss of fluid and are complex and generally unreliable. The present invention has the ability to pump hazardous fluids or utilize power from hazardous fluids and the power is transmitted by means of a drive member extending through the wall containing the pump or motor without the necessity of a dynamic seal. Thus, the driven member can be located external to the fluid systems and power conversion is obtained with no leakage path from the fluid.

In U.S. Patent No. 3,132,525, there is described a drive device which consists of a tube which is restrained about its circumference at a location intermediate the ends of the tube. The input to the drive device consists of means for deforming one end of the tube and means for rotating the deforming means. The opposite end of the tube deforms into the same shape but always 90 degrees out of phase and a rotary output is obtained from this other deforming end. In the present invention, one deformable end is located in a casing and the revolving of the deformation pattern moves the fluid when acting as a pump and is moved by the fluid when acting as a motor. Valve means are provided to separate the incoming and outgoing fluid at one location about the deformable end. By utilizing a solid diaphragm to support the tube intermediate the ends of the drive device, the fluid system located at one end of the tube can be kept completely separate from the drive mechanism at the other tube end without the use of any seals and no external leakage of the fluid can result. The revolving of the deformation pattern provides a positive displacement device whereby the volume flow rate is constant with angular position change, thereby providing steady nonpulsing flow. The device is reversible and as a motor is positive starting in either direction.

It is therefore an object of the present invention to provide a fluid device usable as a pump or motor and having the drive portion separated from the fluid engaging portion by a solid barrier to prevent external leakage of fluid.

Another object of the invention is to provide a fluid device usable as a pump or motor and which utilizes a flexible tube with ends deformable 90 degrees out of phase, one end being the drive member and the other end coacting with the fluid.

Another object of the invention is to provide a fluid device in which the driven member is located external of the fluid system and in which no through shaft or dynamic seals are required.

Another object of the invention is to provide a positive displacement pump or motor in which the volume flow rate is constant with annular position change.

These and other objects of the invention not specifically set forth above will become readily apparent from the accompanying description and drawings in which:

FIGURE 1 is a vertical section of the device of the present invention showing the deformable tube and housing;

FIGURE 2 is a transverse vertical section along line 2—2 of FIGURE 1 showing the drive means for one end of the tube;

Figure 3:
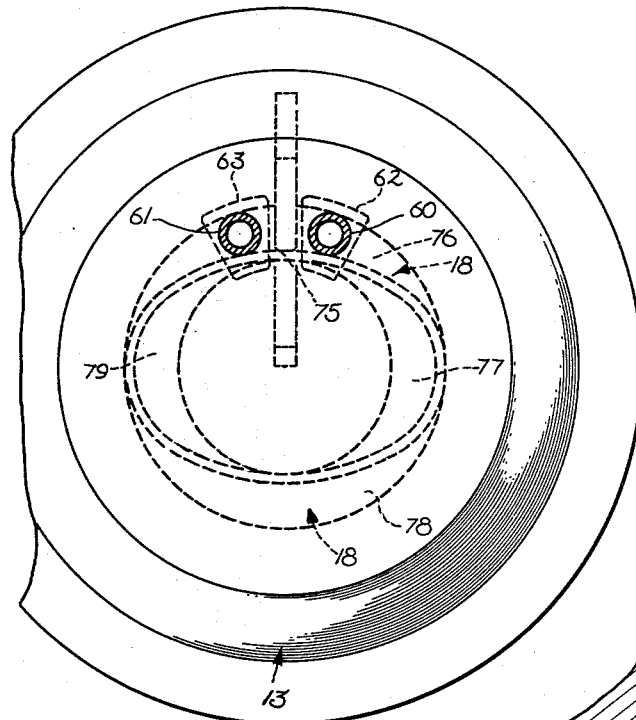
FIGURE 3 is an end elevational view along line 3—3 of FIGURE 1 showing the supply and discharge parts.

Referring to the embodiment of the invention chosen for purposes of illustration, the fluid device consists of a casing 10 located in opening 11 of confinement wall 12. The casing comprises a head section 13 which has an internal shoulder 14 receiving a projecting portion 19 on intermediate casing member 15. The member 13 has a side 16 which defines one side of a cavity 18 and the opposite side is defined by side 17 of the intermediate member 15. The opposed annular sides 16 and 17 are tapered away from each other to give the cavity 18 an arc shaped cross section.

A support member 20 is secured to the containment wall 12 by means of weld 21, and a sealing ring 22 is located between the wall 12 and the support member 20 to prevent leakage from the left side of the wall 12. An annular projection 23 on member 20 engages a ledge 24 on intermediate member 15 in order to locate and support the intermediate member 15 and the outer head member 13. An opposite annular projection 26 engages the interior of a foot 27 on an end member 30 which has an internal cavity 31 in communication with a reduced cavity 32. An end flange 33 on member 30 serves as a mounting plate for a drive motor 34 which would be utilized when the device is utilized as a pump. It is understood that the drive motor 34 can be of standard construction and is attached to the flange 33 in any well known manner. Also, the various sections of the casing can be secured together by bolts, or welds, or the like.

The intermediate portion of support member 20 is reduced to form a cylindrical diaphragm 38 which is continuous and provides a fluid tight barrier between opposite sides of the support member 20. Formed integrally with barrier 38 is a flexible, thin walled tube 39 having equal portions 40 and 41 on opposite sides of the barrier. The portion 41 is located in the cavity 18 between the head member 13 and intermediate member 15 and the end 40 is located within the cavity 31 of the end member 30. The inner ends 43 and 44 of casing members 13 and 15, respectively, are located adjacent the barrier 38 at its connection with the end 41 of the tube 39.

Figure 8:
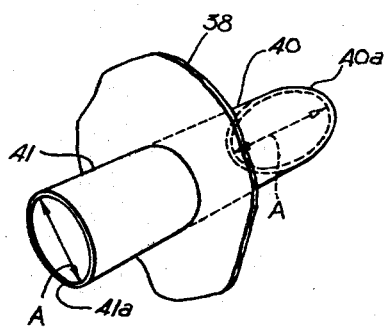
FIGURE 8 is a perspective view of the deformable tube and supporting diaphragm.

The drive shaft 46 of motor 34 has a splined end 47 which is insertable into the spline interior of a shaft 48 located in cavity 32. The shaft 48 is supported by bearings 49 and 50 which are separated by a spacer 51. The shaft 48 has an enlarged end 53 which is shaped in the form of an ellipse and this enlarged end carries an elliptical shaped ball bearing comprising a fixed inner race 54 which is held on shaft end 53 by retainer ring 52 and supports balls 55. The outer race 56 for the balls 55 is flexible and is located within the open end of tube portion 40 so that the end 40a of portion 40 will assume an elliptical shape similar to end 53. As the end 53 is rotated, the major axis of the ellipse of the tube end 40a will follow the rotation of the major axis of the elliptical end 53 of the shaft 48. In FIGURES 1 and 2, the major axis of the end 53 is shown in vertical position and the end 40a of the portion 40 assumes an elliptical shape in which its major elliptical axis is in line with the major axis of the end 53. As disclosed in U.S. Patent 3,132,525, the tube 39 supported by the barrier 38 has the property that as the major axis A of the end 40a of the tube portion 40 is rotated, the major axis B of end 41a of the tube portion 41 will rotate at the same rate but will remain 90 degrees out of phase and the end 41a will assume the same elliptical shape as the end 40a (see FIGURE 8).

The drive motor 34 provides rotary motion for the elliptical shaft end 53 and as the elliptical inner race rotates, the flexible outer race 56 is caused to deflect so as to change the annular position of the major axis of end 40a such that it always remains coherent with the elliptical axis of the end 53. As the major axis of the end 53 is rotated, the shape of opposite end 41a of the tube follows the shape of driven end 40a with a phase lag of 90 degrees. Also, as the end 40a is moved through rotation of the end 53, the end 41a moves back and forth in the tapered cavity 18. The surface 17 is positioned to match the outer surface of the tube portion 41 at the major axis and the surface 16 is shaped to match the outer surface of the tube portion at the minor axis.

Inlet and outlet fluid passages 60 and 61, respectively, extend from casing 10 and connect with enlarged spaces 62 and 63, respectively, communicating with the cavity 18 and located in the wall of the head member 13. A divider plate 65 is located in a slot 66 in member 15 extending upwardly from the cavity 18 and the plate 65 is continuously biased against the surface of tube portion 41 by means of a spring 67 located between the plate and the bottom surface 68 of the slot. Also, an inner divider plate 70 is located in a slot 71 in member 13 opposite to the slot 66 and is held against the inside surface of the tube portion 41 by means of a spring 72 located between the plate 70 and the bottom surface 73 of the slot. As illustrated in FIGURE 3, the supply port 62 is positioned directly to the right of the divider plates and the discharge port 63 is located directly to the left of the divider plates. As the end 41a of the tube has its major axis rotated, the divider plates 65 and 70 will continually bear on opposite sides of the linear portion 75 of the tube in order to continually place an impervious barrier across the cavity 18 along the length of portion 75. As illustrated in FIGURE 3, the tube portion 41 divides the cavity 18 into four separated spaces 76, 77, 78, and 79.

Figure 4:
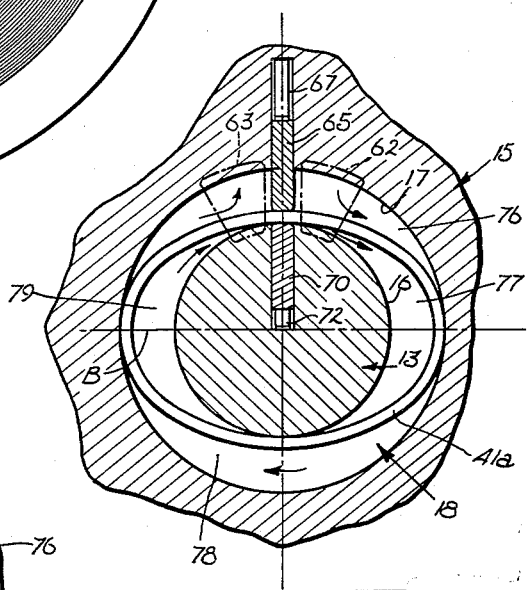
FIGURE 4 is a transverse vertical section along line 4—4 of FIGURE 1 showing the fluid system end of the tube with its major axis in horizontal position.
Figure 5:
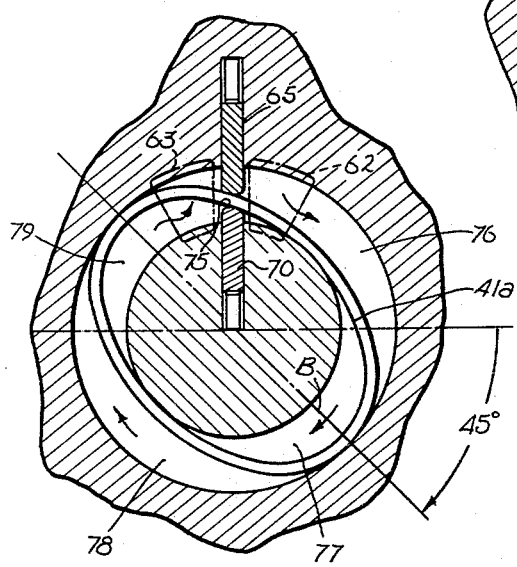
FIGURE 5 is a transverse vertical section similar to FIGURE 4 with the major axis displaced 45 degrees.
Figure 6:
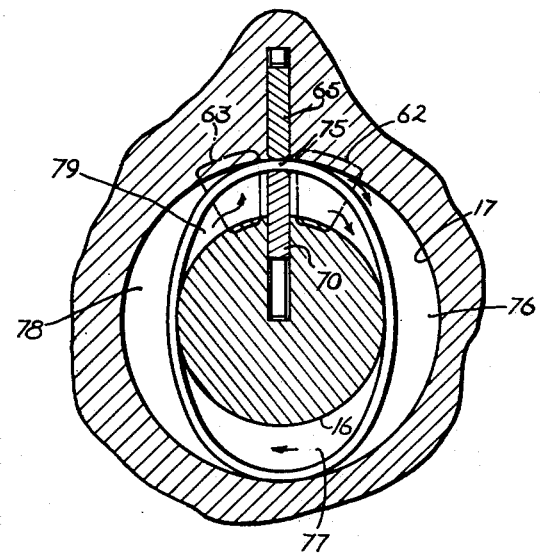
FIGURE 6 is a transverse vertical section similar to FIGURE 4 with the major axis of the tube end displaced 90 degrees.
Figure 7:
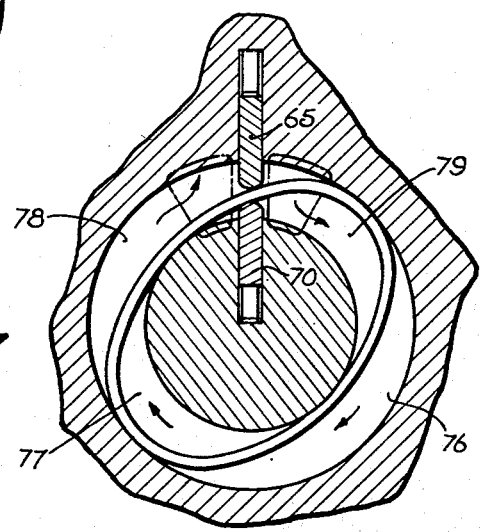
FIGURE 7 is a transverse vertical section similar to FIGURE 4 with the major axis of the tube end displaced 120 degrees.

The operating principle of the fluid device when operating as a pump is illustrated in FIGURES 4, 5, 6, and 7. Referring to FIGURE 4, the major axis B of the elliptical end 41a of the tube is shown as horizontal and the barriers 65 and 70 are in the lowest position with tube portion 75 located at surface 16. In such condition, fluid is flowing from inlet port 62 into the spaces 76 and 77 to the right of the barriers 65 and 70. At the same time fluid is being forced through the outlet port 63 from the space 76 to the left of barrier 65 and from the space 79 to the left of barrier 70. The directions of fluid flow in each case is indicated by the arrows. After 45 degrees of clockwise rotation of the major axis of the end 41a (see FIGURE 5), the barriers assume an intermediate position wherein fluid continues to enter the space 76 to the right of barrier 65 from port 62 and substantially all of the fluid in the space 76 to the left of barrier 65 has been discharged through opening 63. Also, the fluid in space 79 to the left of barrier 70 is commencing to enter the outlet passage 63. The fluid in spaces 77 and 78 is being moved along through the cavity 18 by the rotation of the major axis B. Referring to FIGURE 6, the major axis of end 41a has rotated 90 degrees from FIGURE 4 into vertical position and the barriers 65 and 70 are in their uppermost position. The inlet of fluid into the space 76 to the right of barrier 65 is about to cease while the inlet of fluid into the space 79 to the right of barrier 70 is increasing. Also, the space 77 is moving around towards the outlet 63 and the space 78 has just commenced to discharge through the outlet port 63 to the left of barrier 65. The fluid in the space 79 to the left of the barrier continues to discharge through outlet 63 as it is squeezed between the tube portion 41, the barrier and the surface 16 of member 13. In FIGURE 7, the major axis has rotated 120 degrees from its position in FIGURE 4 and the barriers are in an intermediate position. The space 79 to the left of barrier 70 has substantially discharged the fluid while the space 79 to the right of the barrier is still receiving fluid. The space 78 to the left of the barrier 65 is continuing to discharge through outlet 63 while the space 78 to the right of barrier 65 is beginning to take in fluid. The fluid trapped in spaces 76 and 77 continue to move toward the discharged port 63 where the fluid in space 77 will be discharged by the reduction of the space to the left of barrier 70 in the same manner as shown in FIGURES 5 and 6 for space 79. Also, the fluid in space 76 will again be pumped through outlet 63 by the reduction in space to the left of the barrier 65 in the same manner as illustrated in FIGURES 4 and 5.

It is therefore apparent that each of the spaces to the right of the barriers 65 or 70 enlarge as the major axis rotates clockwise in order to draw in fluid from inlet port 62 and thereafter each of the spaces become sealed in the cavity 18 until a portion of the space encounters the barrier 65 or 70 on the left side. At this time, the size of the spaces to the left of the barriers reduce as continued rotation of the major axis continues thereby forcing the fluid from the spaces out the discharge of port 63. Thus, a positive pumping action is obtained by the continual clockwise rotation of the major axis of the end portion 41 of the flexible deformable tube 39. As the volume of each of the spaces exposed to the supply port increases and draws fluid into the pump, the volume exposed to the discharge port is continually decreasing and forcing fluid out of the pump through the discharge port.

In the event it is desired to utilize the fluid device as a generator instead of a pump, pressure fluid that would be introduced to the passage 63 to act on the portion 41 of the tube to cause the major axis to rotate in a counterclockwise direction and the fluid would be discharged to a low pressure outlet passage 62. At the same time, the major axis A of the end 40a would be caused to rotate by the rotation of major axis B and would drive the elliptical end 53 of shaft 52 thereby rotating the shaft 46 of device 34 which would be in the form of a generator rather than a motor.

The device is of the positive displacement type whereby the volume flow rate is constant with annular position change so that a steady, nonpulsive flow will result when acting as a pump and a steady generating force will result when acting as a generator. The device has the ability to pump hazardous fluids and utilize power from hazardous fluids which would be located within the confinement wall 12 and completely separated from the generator or motor end of the device by the continuous diaphragm 38. While the drive device of Patent No. 3,132,525 could be connected by a separate drive means to a pump located beyond wall 12, the present invention provides a pumping action directly from one deformed end of the deformable tube so that an intermediate drive is not necessary. The construction of the casing component can be varied to produce a suitable enclosure and the elliptical drive can be modified by the use of large rollers rather than ball bearings. Various other modifications are contemplated by those skilled in the art without departing from the spirit and scope of the invention as hereinafter defined by the appended claims.

What is claimed is:

1. A fluid device comprising:
   a deformable tube supported by a diaphragm about its periphery at a location intermediate the ends thereof, said diaphragm separating said tube into first and second end portions terminating in first and second tube ends;
   the deformation of said first end portion resulting in the same deformation of said second end portion but with a phase difference of 90 degrees;
   rotatable drive means having a deformed drive member located within said first end of said first tube portion for progressively deforming said first end portion;
   fluid cavity means receiving said second end portion of said tube while said second end portion is deformed during deformation of said first end;
   said fluid cavity means having movable barrier means for blocking said cavity at one location while permitting said second end portion of said tube to deform; and
   inlet and outlet ports located adjacent to and on opposite sides of said barrier means for controlling fluid flow through said cavity means.

2. A device as defined in claim 1 wherein:
   said drive means comprises an elliptically shaped drive member; and
   means located between said drive member and said one tube end for shaping said one tube end into an elliptical shape.

3. A device as defined in claim 1 wherein:
   said shaping means comprises a rigid bearing race carried by said drive member and a flexible bearing race carried by said first end of said tube.

4. A device as defined in claim 1 wherein said barrier means comprises:
   transverse slits on opposite sides of said cavity;
   a first barrier located in one of said slits;
   a second barrier opposite said first barrier and located in the other of said slits;
   springs means for maintaining said first and second barriers in contact with said second tube end portion.

5. A fluid device as defined in claim 1 wherein said cavity for said second end portion extends along the length of said second portion and terminates at said barrier, said cavity being annular and having a cross section defined by a segment of a circle having a radius equal to the length of said second tube portion; the inner end of said cavity being sealed by said barrier.

6. A device as defined in claim 1 wherein said diaphragm is integral with said tube and extends completely through said tube to seal said cavity from said drive means.

7. A fluid device comprising:
   a deformable tube supported by a diaphragm about its periphery at a location intermediate the ends thereof so that the deformation of the tube portion on one side of said diaphragm results in the same deformation of the tube portion on the other side of said diaphragm with a phase difference of 90 degrees;
   drive means having a deformed drive member in contact with said tube portion on said one side;
   fluid cavity means receiving said tube portion on said other side;
   barrier means for continually blocking said cavity at one location while permitting said tube portion on said other side to deform therein; and
   inlet and outlet ports located adjacent to and on opposite sides of said barrier means for controlling fluid flow through said cavity means.

8. A fluid device as defined in claim 7 wherein:
   said drive means comprises a motor for rotating said drive member to continually deform said tube portion on said one side; and
   the phase deformation of said tube portion on said other side providing a pumping action by receiving fluid from said inlet port and discharging fluid at a higher pressure through said outlet port.

9. A device as defined in claim 7 wherein the drive means comprises:
   an output shaft connected at one end with said drive member; and a deformed member;
   load means connected with the other end of said output shaft;
   high pressure fluid being introduced to the inlet port in order to drive the tube portion on said other side and produce a torque on said output shaft.

References Cited by the Examiner

UNITED STATES PATENTS

| Re. 23,992 | 5/55 | Cornelius | 103—133 |
| 2,451,603 | 10/48 | Barker | 103—130 |
| 2,849,962 | 9/58 | Musser | 103—149 |
| 2,910,006 | 10/59 | Musser | 103—149 |
| 2,073,250 | 1/63 | Musser | 103—117 |
| 3,132,525 | 5/64 | Davids | 74—17.8 |

JOSEPH H. BRANSON, Jr., *Primary Examiner.*